United States Patent
Zebisch et al.

(10) Patent No.: US 10,646,891 B2
(45) Date of Patent: May 12, 2020

(54) DEVICE FOR DEPOSITING OVERSPRAY AND SURFACE TREATMENT INSTALLATION

(71) Applicant: EISENMANN SE, Boeblingen (DE)

(72) Inventors: Tobias Zebisch, Sindelfingen (DE); Juergen Roeckle, Magstadt (DE); Uwe Knaus, Ispringen (DE); Joachim Juerss, Ulm (DE)

(73) Assignee: EISENMANN SE, Boeblingen (DE)

(*) Notice: Subject to any disclaimer, the term of this patent is extended or adjusted under 35 U.S.C. 154(b) by 163 days.

(21) Appl. No.: 15/742,302

(22) PCT Filed: Jul. 8, 2016

(86) PCT No.: PCT/EP2016/066277
§ 371 (c)(1),
(2) Date: Jan. 5, 2018

(87) PCT Pub. No.: WO2017/009228
PCT Pub. Date: Jan. 19, 2017

(65) Prior Publication Data
US 2018/0207669 A1 Jul. 26, 2018

(30) Foreign Application Priority Data

Jul. 13, 2015 (DE) .................. 10 2015 008 844

(51) Int. Cl.
*B05B 14/43* (2018.01)
*B05B 16/40* (2018.01)
(Continued)

(52) U.S. Cl.
CPC .......... *B05B 16/40* (2018.02); *B05B 13/0452* (2013.01); *B05B 14/43* (2018.02); *B05B 15/65* (2018.02)

(58) Field of Classification Search
CPC ............ B01D 46/0002; B01D 46/0013; B01D 46/002; B01D 46/0023; B01D 46/0093;
(Continued)

(56) References Cited

U.S. PATENT DOCUMENTS

| 3,719,030 A | 3/1973 | Blankemeyer et al. |
| 4,498,913 A * | 2/1985 | Tank ....................... B05B 14/43 |
| | | 55/356 |

(Continued)

FOREIGN PATENT DOCUMENTS

| DE | 102 09 499 A1 | 10/2003 |
| DE | 10 2011 108 631 A1 | 1/2013 |

(Continued)

*Primary Examiner* — Minh Chau T Pham
(74) *Attorney, Agent, or Firm* — Schroeder Intellectual Property Law Group, LLC

(57) ABSTRACT

A device for depositing overspray from the overspray-charged booth air of coating installations with a flow system for booth air. The flow system includes a number of depositing units through which overspray-charged booth air can be directed and in which overspray is deposited. The depositing units are designed as an exchangeable structural unit with a filter housing, a filter inlet, a filter unit and a filter outlet, each of which can be fed to the flow system and can thereby be moved into or out of an operating position. In the operating position of a depositing unit, the filter inlet is connected to an associated first flow connection of the flow system and the filter outlet is connected to an associated second flow connection of the flow system. There are docking means, by which the filter inlet and the filter outlet of one of the depositing units and the flow connections of the flow system are forcibly aligned in relation to one another during the feeding movement.

19 Claims, 7 Drawing Sheets

(51) Int. Cl.
*B05B 15/65* (2018.01)
*B05B 13/04* (2006.01)

(58) Field of Classification Search
CPC .......... B01D 50/002; B01D 2258/0258; B01D 2267/00; B05B 14/43; B05B 16/40; B05B 13/0452; B05B 15/65
USPC ............ 118/326, 309; 55/DIG. 46; 296/24.1, 296/26.13, 26.12
See application file for complete search history.

(56) References Cited

U.S. PATENT DOCUMENTS

| | | | |
|---|---|---|---|
| 5,853,215 A * | 12/1998 | Lowery | B60P 3/14 296/24.32 |
| 6,669,780 B2 | 12/2003 | Browning et al. | |
| 6,723,169 B2 | 4/2004 | Hihn et al. | |
| 9,321,070 B2 | 4/2016 | Link et al. | |
| 2013/0047854 A1 | 2/2013 | Jancik | |
| 2014/0202332 A1 | 7/2014 | Link et al. | |
| 2015/0367372 A1 | 12/2015 | Roeckle et al. | |
| 2016/0288036 A1 | 10/2016 | Wieland et al. | |

FOREIGN PATENT DOCUMENTS

| | | |
|---|---|---|
| DE | 20 2012 012 511 U1 | 3/2013 |
| DE | 10 2013 001 982 A1 | 8/2014 |
| EP | 1 342 507 A1 | 9/2003 |
| WO | 2015/062976 A1 | 5/2015 |

* cited by examiner

DEVICE FOR DEPOSITING OVERSPRAY AND SURFACE TREATMENT INSTALLATION

RELATED APPLICATIONS

This application is a national phase of International Patent Application No. PCT/EP2016/066277 filed Jul. 8, 2016, which claims the filing benefit of German Patent Application No. 10 2015 008 844.0 filed Jul. 13, 2015, the contents of both of which are incorporated herein by reference.

FIELD OF THE INVENTION

The device relates to a device for depositing overspray from the overspray-charged booth air of coating installations, in particular of painting installations, having
a) a flow system for the booth air;
wherein
b) the flow system comprises a plurality of depositing units through which overspray-charged booth air is directable and in which overspray is deposited;
c) the depositing units are configured as an exchangeable construction unit having a filter housing, a filter inlet, a filter unit, and a filter outlet, each of which being feedable to the flow system and herein in a feeding movement is movable to an operating position, or from the operating position is separable and removable from the flow system;
d) in the operating position of a depositing unit, the filter inlet of this depositing unit is connected to an associated first flow connector of the flow system, and the filter outlet of this depositing unit is connected to an associated second flow connector of the flow system.

The invention moreover relates to a surface treatment installation, in particular a painting installation, for treating objects, having
a) a treatment booth having a treatment tunnel through which booth air is directable, wherein the air absorbs and entrains overspray that is present;
wherein
b) the treatment booth comprises a depositing region in which a depositing device is disposed, overspray-charged booth air being directable to said depositing device and overspray being depositable by said depositing device.

BACKGROUND OF THE INVENTION

In the manual or automatic application of paint to objects, a partial flow of the paint which generally contains both solid matter and/or binding agents as well as solvents, is not applied to the object. This partial flow in the industry is referred to as "overspray". Furthermore, overspray is always understood in the context of a dispersed system such as an emulsion or a suspension, or a combination thereof. The overspray is acquired by the airflow in the painting booth and fed to a separator such that the air, optionally upon suitable conditioning, can be redirected into the coating booth.

In particular in the case of installations with a high consumption of paint, for example in the case of installations for painting vehicle bodies, wet depositing systems, on the one hand, or electrostatically operating dry depositing systems, on the other hand are used in a known manner. In the case of known wet separators, a comparatively large amount of energy is required for recirculating the rather large quantity of water required. The preparation of the rinsing water on account of the high-level of chemicals that bind and de-tack paint and on account of the disposal of the paint sludge is cost intensive. Furthermore, the air on account of the intensive contact with the rinsing water absorbs a large amount of moisture which in the recirculating operation in turn results in a high consumption of energy for the preparation of the air. In the case of electrostatically operating dry separators, the paint overspray has to be continuously removed from the depositing faces which is often associated with rather complex measures in terms of construction and can accordingly be prone to malfunctions. Moreover, the energy input in the case of such separators is comparatively high.

As an alternative to these depositing systems, devices of the type mentioned at the outset which operate using exchangeable filter modules which upon reaching a limit load with overspray are exchanged for unladen filter modules and are disposed of or optionally recycled are known. The preparation and/or disposal of filter modules of this type in terms of energy as well as in terms of the resources required can be more sustainable than the investment in the case of a wet separator or of an electrostatically operating depositing device.

Such filter modules are fed to the overspray-charged booth air which flows through the filter module and leaves the latter as exhaust air that is largely relieved of overspray. For the sake of simplicity, such an exhaust air hereunder is also referred to as booth air or as booth air that is relieved of overspray.

SUMMARY OF THE INVENTION

It is now an object of the invention to achieve a device and a surface treatment installation of the type mentioned at the outset in which a comparatively simple exchange of two depositing units is guaranteed simultaneously with a reliable connection of the respective connectors in terms of flow technology.

In the case of a device of the type mentioned at the outset, this object may be achieved in that docking means by way of which the filter inlet and the filter outlet of one of the depositing units and the flow connectors of the flow system during the feeding motion are forcibly aligned in relation to one another are present.

It has been recognized according to the invention that the positioning and alignment can be effectively supported by docking means, without said positioning and alignment having to be performed manually. Forcibly herein is presently to be understood that the alignment of the components in the feeding movement of the depositing units, as opposed to manual aligning, is performed automatically, that is to say in a self-acting manner, since the depositing unit and/or the flow connectors on account of the docking means are forced to follow a specific motion sequence.

It is favorable herein for the docking means to comprise a guiding apparatus by means of which the depositing units in the feeding movement are guided in a respective feeding path.

This guiding apparatus preferably offers guiding faces for in each case one depositing unit.

To this end, guide profiles which provide guiding faces can be present, for example.

Particularly advantageously, the guide profiles can be comprised by a connector frame which offers a first flow connector of the flow system.

Moreover, a base guide by way of which in each case one of the depositing units is guidable across a base part of this depositing unit is advantageously provided.

The first flow connector herein in terms of flow technology is preferably connected to an air guiding system by way of which overspray-charged booth air is directable to the respective filter inlets of the depositing units.

It is particularly advantageous for the docking means to comprise a centering apparatus by means of which in the feeding movement of one of the depositing units the filter inlet of said depositing unit is centered in relation to the first flow connector, and/or the filter outlet of said depositing unit is centered in relation to the second flow connector. On account thereof, the connectors that are to be intercoupled can be aligned in particular.

The alignment can be performed effectively when the centering apparatus comprises one or a plurality of guide wedges which laterally flank the second flow connector of the flow system.

It is moreover favorable for the docking means to comprise an arrester apparatus by way of which the depositing units in the operating position are arrestable in a releasable manner.

To this end, the arrester apparatus preferably comprises at least one movable clamp which is configured so as to be complimentary to a holding strip on the depositing unit.

When the arrester apparatus is operable by motor power, the docking procedure can be performed in an at least semi-automated manner.

With a view to the overall construction it is favorable for the docking means to at least be partially comprised by a docking unit which has a housing which provides the first flow connector and/or the second flow connector of the flow system.

Again with a view to an automated feeding movement, it is advantageous for a conveying mechanism by way of which the feeding movement can be performed at least in portions to be present.

The conveying mechanism herein comprises in particular a roller conveyor, preferably a passive roller conveyor having freely running conveyor rollers.

Alternatively or additionally, the conveying mechanism can comprise idler rollers on a respective base part of the depositing units.

The above-mentioned object in the case of a surface treatment installation of the type mentioned at the outset may be achieved in that the depositing device is configured so as to have some or all features that have been explained above.

With a view to a good integration of the participating components it is favorable for the treatment booth at least in regions to be constructed according to a grid which is predefined by the depositing units.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention will be explained in more detail hereunder by means of the drawings. In said drawings.

DETAILED DESCRIPTION OF THE PRESENT INVENTION

Figure 1:
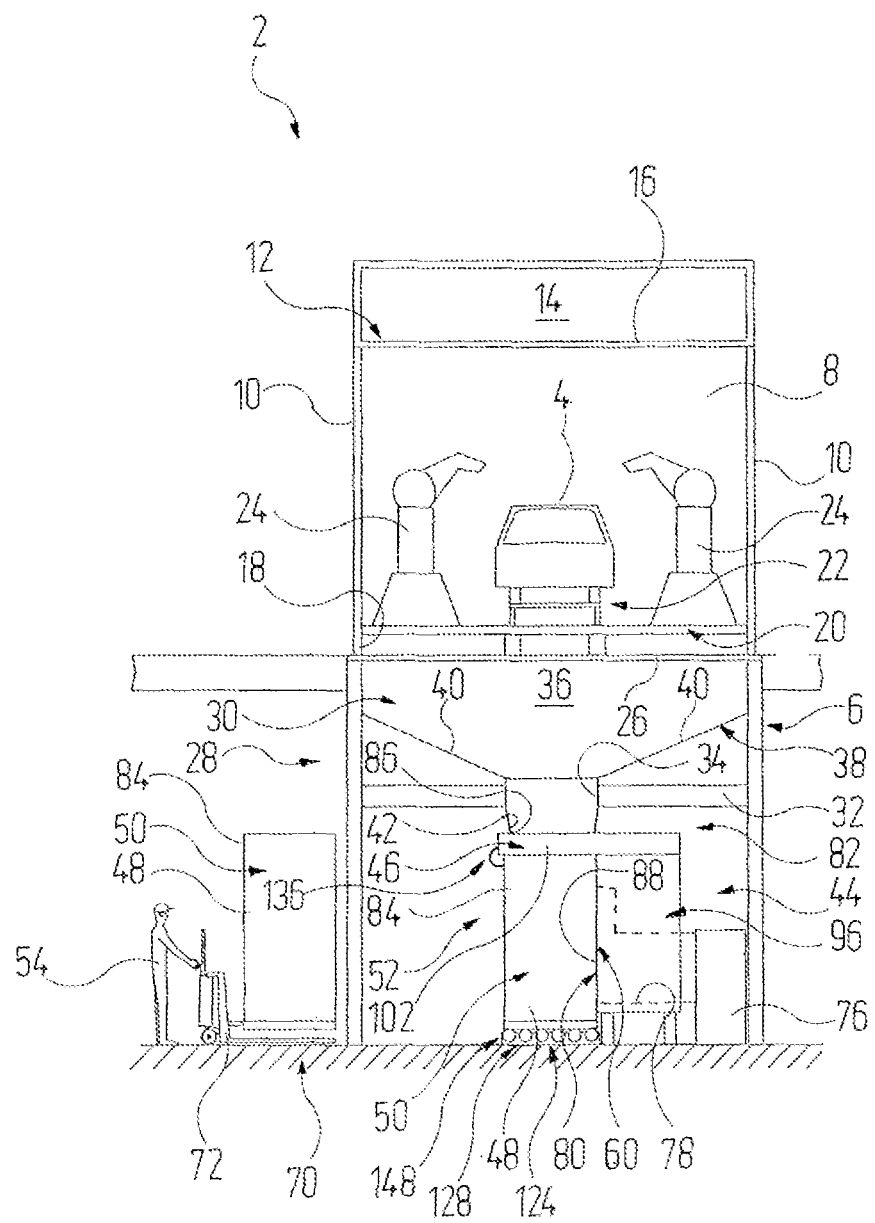
FIG. 1 shows in a front view a painting booth having a depositing device for overspray, according to a first exemplary embodiment, in which booth air by way of in each case one outlet connector of an air directing apparatus is directed to in each case one filter module and is dispensed from the latter to in each case one inlet connector of a collector duct, wherein one docking unit is present for each filter module.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 will be discussed first. Therein, as an example of a coating booth, intotal one painting booth of a surface treatment installation is identified by the reference sign 2, vehicle bodies 4 being painted in said painting booth, once said vehicle bodies 4 in pre-treatment stations (not specifically shown) which are upstream of the painting booth 2 have been cleaned and degreased, for example. The painting booth 2 rests on a steel construction 6, as is known per se.

The painting booth 2 comprises a painting tunnel 8 which is disposed on the top and is delimited by vertical sidewalls 10 and a horizontal booth ceiling 12 but is open at the end sides. The painting tunnel 8 toward the bottom is moreover open in the way that overspray-charged booth exhaust air can flow out of the painting tunnel 8 in a downward manner. The booth ceiling 12 in the usual manner is configured as the lower delimitation of an air feeding space 14 having a filter ceiling 16.

A steel framework 20 which supports a conveyor mechanism 22 that is known per se and which is not discussed in more detail here is disposed above a lower opening 18 of the painting tunnel 8. Vehicle bodies 4 that are to be painted can be transported by said conveyor mechanism 22 from the entry side of the painting tunnel 8 to the exit side of the latter. Application apparatuses in the form of multi-axis application robots 24 such as are known per se are located in the interior of the painting tunnel 8. The vehicle bodies 4 can be coated with paint by means of the application robots 24.

The lower opening 18 of the painting tunnel 8 is covered by a gridiron 26 that can be accessed on foot. An installation region 28 in which the overspray particles that are entrained by the booth air are separated from the booth air is located below the gridiron 26.

Air thus flows from the air feeding space 14 downward through the painting tunnel 8 to the installation region 28 where the air in the painting tunnel 8 absorbs paint overspray that is present and entrains the latter.

The installation region 28 comprises a flow region 30 into which the overspray-charged booth air initially flows and which to this end is open toward the top and toward the painting booth 2, but is laterally delimited by the sidewalls 10 and downward by an intermediate ceiling 32. The intermediate ceiling 32 in the longitudinal direction of the booth has a plurality of passages 34 which are disposed behind one another and of which by virtue of the section only one can be seen in FIG. 1.

In the flow region 30, the booth air first makes its way into a guide duct 36 of an air guiding apparatus 38 which is formed by baffles 40 which extend in a downward oblique manner from the sidewalls 10 to the passages 34 in the intermediate wall 32. The guide duct 36 at the bottom opens into a plurality of connector ducts 42 of which in each case one extends through in each case one passage 34 in the intermediate wall 32 and downward into a depositing region 44 of the installation region 28, terminating in an outlet connector 46 in the latter.

In the depositing region 44, the connector ducts 42 in terms of flow technology are in each case coupled to a filter module 48, wherein the booth air in the present exemplary embodiment flows into the filter modules 48 in an overall vertical flow direction.

Each filter module 48 forms one of a plurality of depositing units 50 with which a depositing device that overall is identified with the reference sign 52 and is disposed in the depositing region 44 of the painting booth 2 collaborates. The depositing device 52 in the case of the present exemplary embodiment is thus a depositing filter which is constructed in a modular manner from the depositing units 50 or the filter modules 48, respectively. Each filter module 48 in a manner known per se can be configured as a depositing filter or as an inertia filter or else as a combination thereof.

The filter modules 48 in the case of the present exemplary embodiments are of a container type and have a comparatively large volume, as is demonstrated by a comparison between the filter module 48 and an operator 54 shown in an exemplary manner in FIG. 1.

Figure 2:
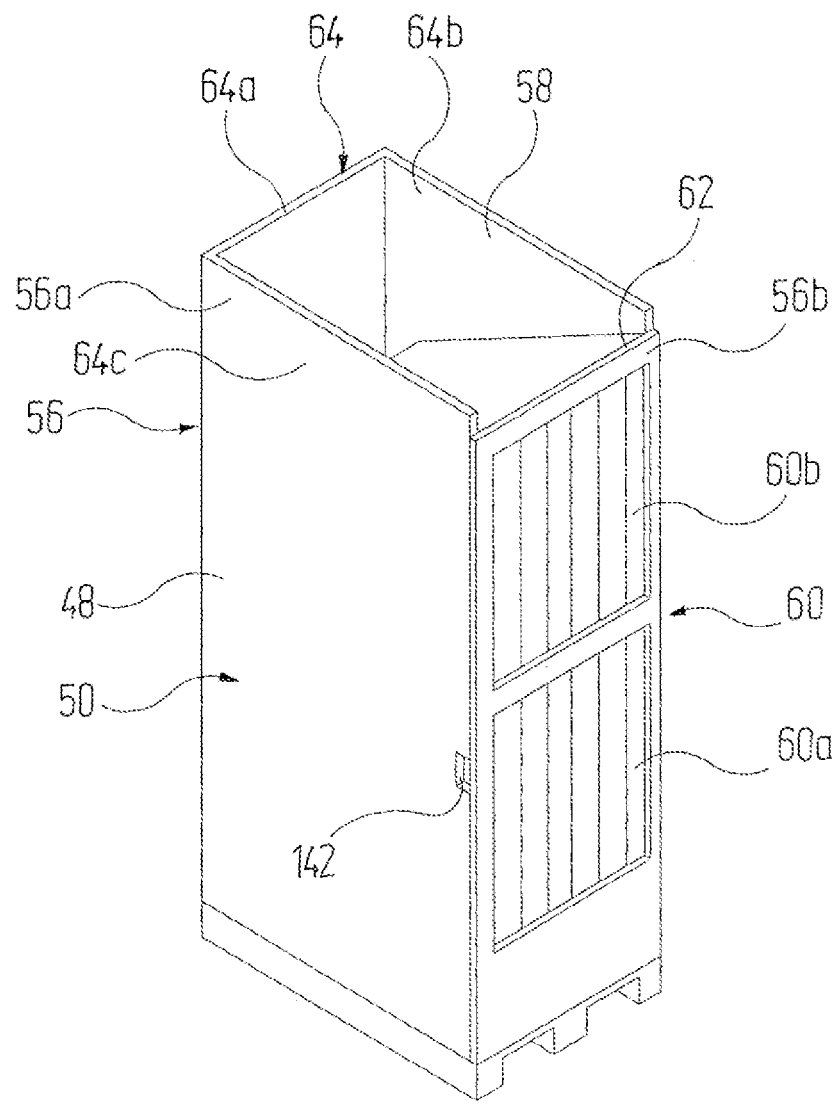
FIG. 2 shows a perspective view of a filter module.

As can be seen in FIG. 2, each filter module 48 has a filter housing 56 having a rectangular cross-section and having a filter inlet 58 which is delimited by an upper inlet region 56a of the housing 56, and having a filter outlet 60 which is provided in a housing wall 56b which defines the front side of the filter module 48.

A passage sink 62 is configured on the housing wall 56b on the upper inlet region 56a of the housing 56. A triangular collar 64 which projects upward in relation to the passage sink 62 is configured on the inlet region 56a of the housing 56 on account of the passage sink 62. This collar 64 in the case of the present exemplary embodiment comprises a bearing leg 64a which is opposite the passage sink 62 and runs parallel with the latter, and two guide legs 64b and 64c which on their part run so as to be mutually parallel and at a right angle to the passage sink 62 and to the bearing leg 64a.

In the case of the present exemplary embodiments, the filter outlet 60 comprises two outlet windows 60a and 60b which in the operative alignment of the filter module 48 are disposed on top of one another. The overspray-charged booth air flows from above from the connector duct 42 of the air guiding apparatus 38 through the filter inlet 58 into the filter module 48, is deflected into the filter module 48, flows through a filter unit 66 which can only be seen in FIGS. 2 and 4 and on which the paint overspray is deposited, and leaves the filter module 48 through the filter outlet 60 as booth air that is largely relieved of overspray. In the case of a modification, the filter unit 66 can also define the filter housing 56.

The filter housing 56 of the filter module 48 comprises a base part 68 which in the case of the present exemplary embodiment in terms of the geometry thereof and the dimensions thereof is configured as a standardized support structure and, for example, according to the parameters of a so-called EUR-pallet. A EUR-pallet has an extent with lateral lengths of 800 mm×1200 mm. When a EUR-pallet or a support structure that in terms of dimension is similar to the former is used as the base part 68, the housing wall 56b having the filter outlet 60 is disposed on the narrow side of the EUR-pallet having the lateral length of 800 mm.

In this way, the filter module 48 can be moved by way of the conveyor mechanism 70 that is adapted to such standard structures. Said conveyor mechanism 70 in the case of the exemplary embodiment shown in FIG. 1 comprises inter alia a forklift truck 72 that can be manually operated by the operator 54.

At least one lower collection region of the filter module 48 is configured so as to be liquid tight and in this manner as a collection pan 74 for paint which is deposited in the filter module 48 and flows downward.

Overall, each depositing unit 50 is configured as an exchangeable construction unit having a filter housing 56, a filter inlet 58, a filter outlet 60, and a filter unit 66.

The exhaust air that is now largely relieved of overspray flows from the filter outlet 60 into a collector duct 76. A plurality of branch ducts 78 of which in each case one can be connected to the filter outlet 60 of a filter module 48 open into the collector duct 76. To this end, the branch ducts 78 at that end thereof that is remote from the collector duct 76 having in each case one inlet connector 80.

The exhaust air by way of the collector duct 76 is fed to further preparation and conditioning and subsequently in a circle (not specifically shown here) it is directed back into the air feeding space 14 from where said exhaust air flows back into the painting tunnel 8 again from above. In the case of the exhaust air received not yet having been sufficiently relieved of overspray particles by the filter module 48, even further filter stages can be disposed downstream of the filter modules 48, the air being supplied to said further filter stages and non-woven filters, for example, or else electrostatically operating depositing filters as are known per se, being employed in said further filter stages. One or a plurality of such further filter stages can optionally also be integrated in the filter module 48. For example, non-woven filter mats can thus be disposed ahead of the outlet windows 60a, 60b of the filter outlet 60.

Additional filter stages can also be provided in the branch ducts 78. In the case of the present overall construction, flow cross sections that are large in comparison with known depositing systems can be implemented such that lower pressure losses result. Overall, a configuration that is optimized in terms of installation space and in which filters for the branch ducts 78 can be adapted to said configuration can be obtained.

The air guiding apparatus 38, the depositing units 50, the collector duct 76, and the branch ducts 78 in this way define a flow system 82 for the booth air, in which the depositing units 50 in each case form an exchangeable duct portion 84. The flow system 82 per se remains operable even when individual depositing units 50 are removed from the flow system 82; this will be discussed once again further below.

In terms of the flow system 82, each outlet connector 46 of the air guiding apparatus 38 thus forms a first flow connector 86 of the flow system 82 for a filter inlet 58 of a depositing unit 50. Each inlet connector 80 of each branch duct 78 accordingly forms a second flow connector 88 of the flow system 82 for a filter outlet 60 of a depositing unit 50. The flow system 82 consequently comprises a plurality of such first flow connectors 86 and a plurality of such second flow connectors 88, of which in each case one is associated with the connecting or separating procedure of a specific depositing unit 50.

The depositing units 50 as exchangeable construction units can now be fed to the flow system 82 and in a feeding movement herein can be moved to an operating position or can be separated and removed from the operating position of the flow system 82. The feeding movement herein can at least in portions be performed with the aid of the conveyor mechanism 70.

Figure 5:
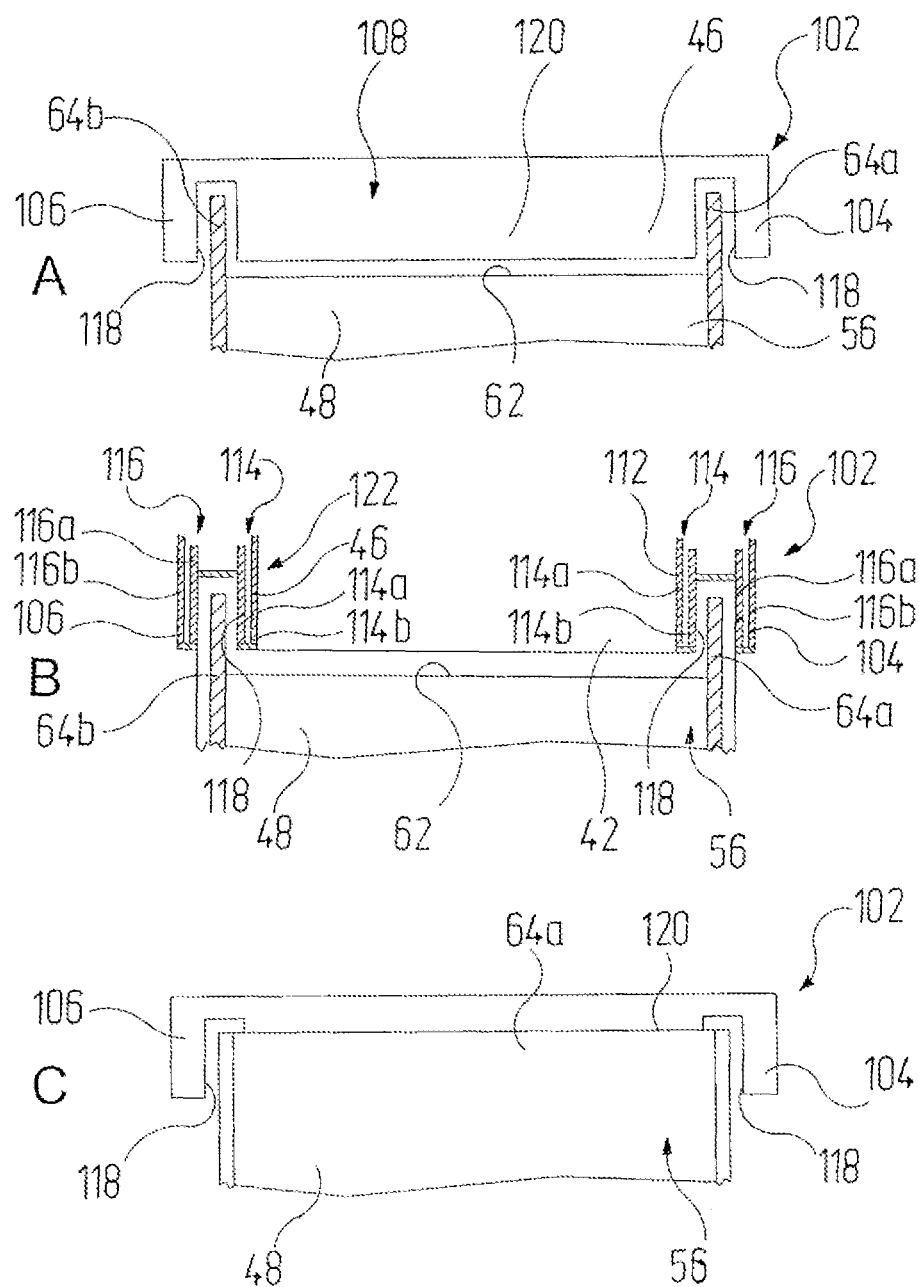
FIGS. 5A, 5B, 5C show a plurality of sections or views, respectively, of a connector frame of the docking unit.
Figure 7:
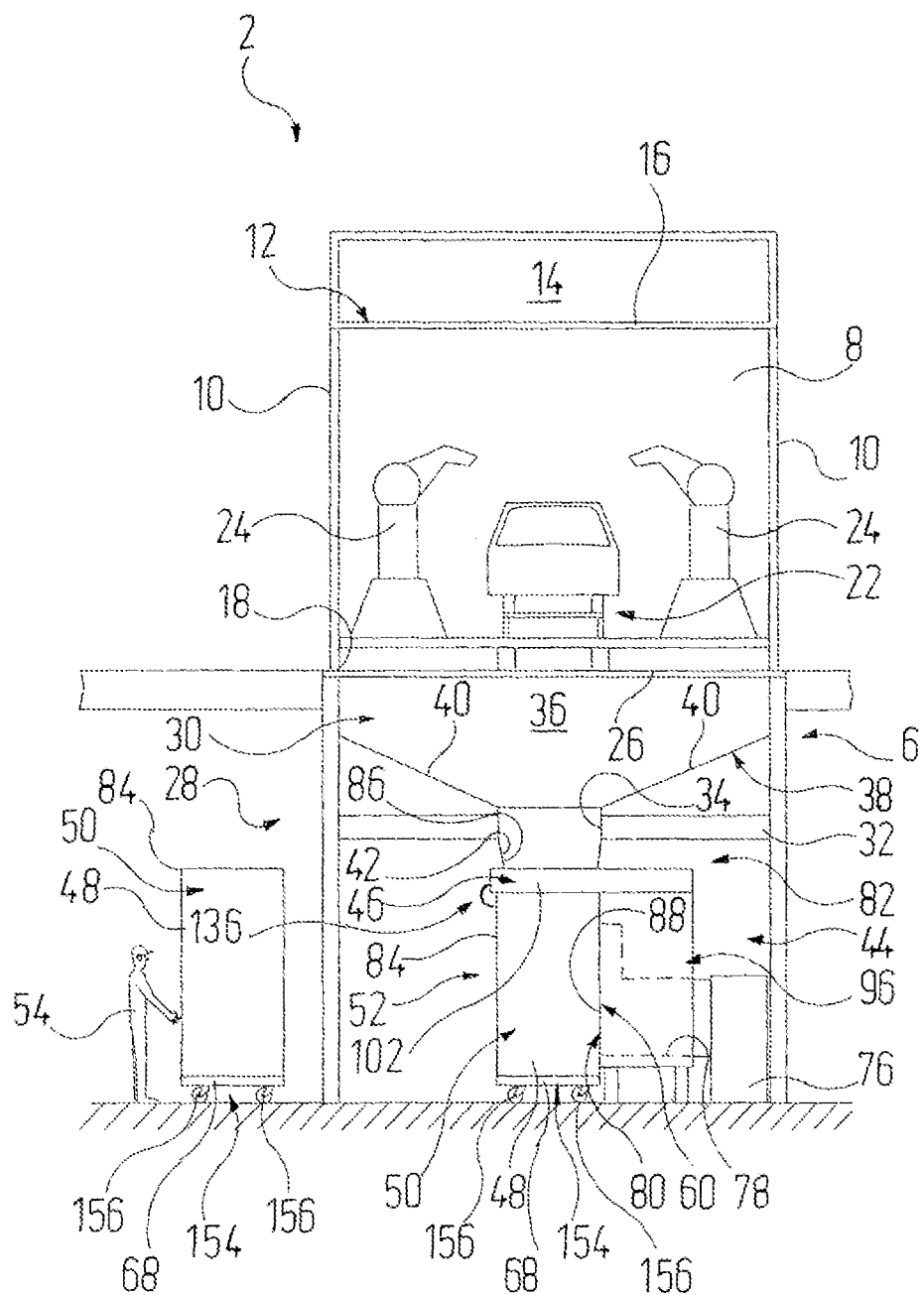
FIG. 7 shows in a front view the painting booth having a depositing device for overspray, according to a second exemplary embodiment, in which a modified conveyor system is employed.

In the operating position of the depositing unit 50, which is illustrated in FIGS. 1, 5, and 7, the filter inlet 58 of said depositing unit 50 is then connected to the first flow connector 86 of the flow system 82, that is to say presently to the outlet connector 46 of the air guiding apparatus 38, and the filter outlet 60 of the depositing unit 50 is connected to the second flow connector 88 of the flow system 82, that is to say presently to the inlet connector 80 of the associated branch duct 78.

In order for the connection in terms of flow technology of the filter inlet 58 to the air guiding apparatus 38 and of the filter outlet 60 to the collector duct system 68 to be reliably guaranteed now, docking means by way of which the filter inlet 58 and the filter outlet 60 of the depositing unit 50, and the flow connectors 86, 88 of the flow system 82, in the feeding movement are forcibly aligned in relation to one another are present for each depositing unit 50, that is to say for each filter module 48.

As opposed to a manual alignment, the alignment of the components in the feeding movement of the depositing unit 50 is thus performed automatically since the depositing unit 50 and/or the flow connectors 86, 88 on account of the docking means are forced to follow a specific motion sequence.

To this end, the docking means comprise a guiding apparatus 90 by means of which a depositing unit 50 in the feeding movement is guided in a feeding path, a centering apparatus 92 by means of which in the feeding movement of a depositing unit 50 the filter inlet 58 of the said depositing unit 50 is centered in relation to the first flow connector 86, and the filter outlet 60 of said depositing unit 50 is centered in relation to the second flow connector 88, and an arrester apparatus 94 by means of which a depositing unit 50 in the operating position can be arrested in a releasable manner. The guiding apparatus 90, the centering apparatus 92, and the arrester apparatus 94 can be seen in FIGS. 4 to 6.

Figure 3:
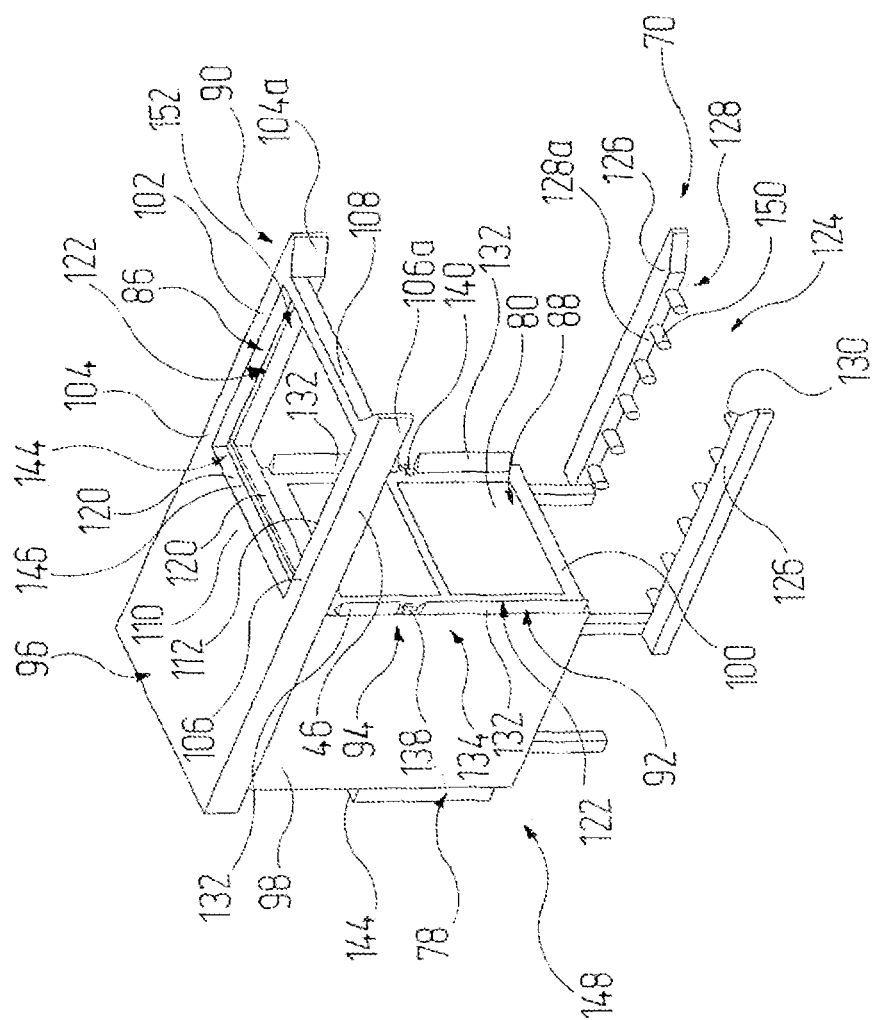
FIG. 3 shows a perspective view of an individual docking unit which in each case comprises the outlet connector of the air directing apparatus and in each case the inlet connector of the collector duct and docking means.
Figure 4:
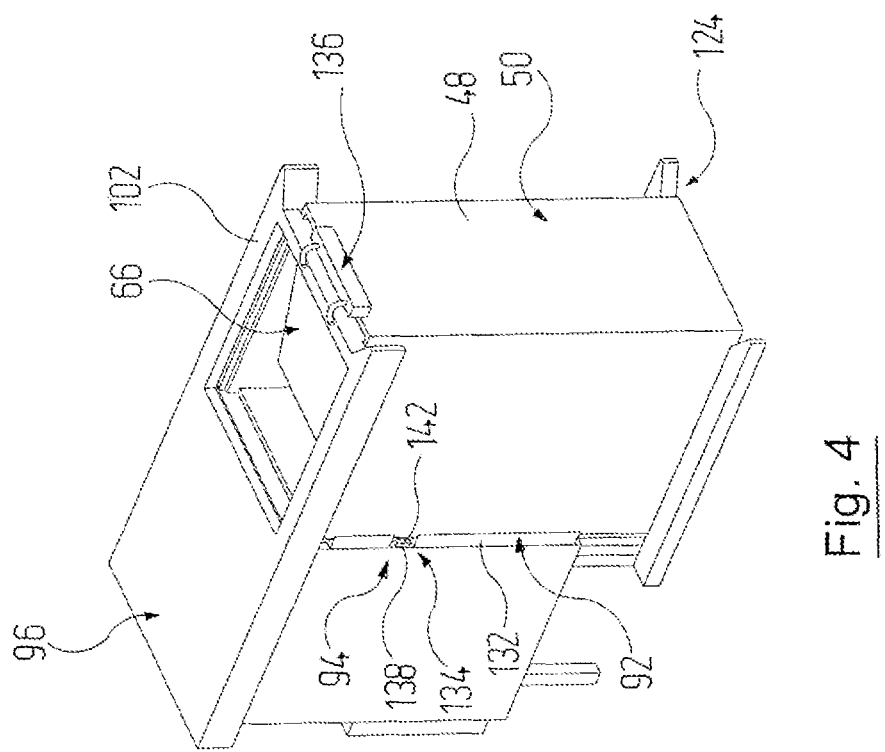
FIG. 4 shows a view that corresponds to that of FIG. 3, of an individual docking unit having a filter module, the latter being in the operating position in relation to this docking unit.

In the case of the present exemplary embodiments, the guiding apparatus 90, the centering apparatus 92, and the arrester apparatus 94 are comprised by a docking unit 96, wherein FIG. 3 shows a docking unit 96 without a filter module 48, and FIG. 4 shows a docking unit 96 with a filter module 48 in the operating position of the latter. In general terms, the docking means are at least partially comprised by the docking unit 96. Each docking unit 94 thus forms the reference variable for defining the operating position of an individual depositing unit 50 within the painting booth 2.

The docking unit 96 has a housing 98 which receives the branch duct 78 between an entry wall 100 and an exit wall which in the case of the present exemplary embodiment is opposite but is not provided with a dedicated reference sign. The housing 98 on the entry wall 100 thus provides the inlet connector 80 of the branch ducts 78, or the second flow connector 88 of the flow system 82, respectively. In a manner complementary to the outlet windows 60a and 60b of the filter module, the housing 98 of the docking unit 96 offers two inlet windows which here do not have a dedicated reference sign.

Moreover, the housing 98 also provides the outlet connector 46 of the air guiding apparatus 38, or the first flow connector 86 of the flow system 82, respectively. For this purpose, a connector frame 102 at the upper end of the housing 98 protrudes at a right angle from the entry wall 100. The connector frame 102 has two parallel guide profiles 104, 106 which at the end that is remote from the entry wall 100 of the housing 98 are connected to a transverse profile 108. On that side that is opposite the transverse profile 108, the housing 98 of the docking unit 96 forms a transverse portion 110 of the connector frame 102 such that said connector frame 102 overall delimits a connector passage 112. This connector passage 112 forms the outlet connector 46 for a connector duct 42 of the air guiding apparatus.

In order for an incoming filter module 48 to be threaded into the connector frame 102 so to speak, the guide profiles 104, 106 extend beyond the transverse profile 108 and there form guide wedges 104a, 106a, the wedge faces of the latter being mutually opposite in the horizontal direction.

FIGS. 5A, 5B, and 5C now show the connector frame 102 and in each case one fragment of the filter module 48. FIG. 5A herein shows a front view of the connector frame 102 having a sectioned filter module 48; FIG. 5B herein shows a section of the connector frame 102 and of the filter module 48; and FIG. 5C shows the connector frame 102 and the filter module 48 in a view from the front.

The guide profiles 104, 106 are configured as profiles that are bent and optionally formed from a plurality of sheet-metal profiles, having in each case two parallel profiled collars 114, 116 which protrude downward and therebetween define a receptacle groove 118. The receptacle grooves 118 herein run such that the former terminate beside the wedge faces of the guide wedges 104a, 106a and are open at this end side. The transverse profile 108 in relation thereto extends between the profiled collars 114 that in the direction transverse to the docking station 96 are inboard.

When the filter module is in the operating position, the guide legs 64b and 64c are pushed into these receptacle grooves 118 as is illustrated in FIGS. 5A and 5B. The receptacle grooves 18 thus provide guiding faces for the filter module 48.

These inboard profiled collars 114 at the same time delimit the outlet connector 46 of an outlet duct 42 of the air guiding apparatus 38. On the entry wall 100 of the docking unit 96, the transverse portion 110 there delimits this outlet connector 46 which moreover on the opposite side is delimited by the transverse profile 108. The external face of the latter forms a bearing face 120 on which the bearing leg 64a of the filter module 48 bears when the latter occupies its operating position.

The profiled collars 114, 116 are in each case configured as double collars each having two profiled walls 114a, 114b, or 116a, 116b, respectively. In the case of the present exemplary embodiment, the two profiled walls 114a, 114b and 116a, 116b of each profiled collar 114, 116 are interconnected at the bottom such that the profiled collars 114, 116 are closed at the bottom. In the case of a modification (not specifically shown) the profiled collars 114, 116 are open at the bottom.

In this way, the docking unit 96 on account of the connector frame 102 thereof thus provides the first flow connector 86 of the flow system 82 and specifically the outlet connector 46 of the air guiding apparatus 38.

The connector frame 102 on account of the guide profiles 104, 106 and of the profiled collars 114, 116 forms a sealing apparatus 122 in the form of a labyrinth seal which seals the filter inlet 58 of the filter module 48 in the operating position thereof in relation to the connector duct 42 of the air guiding apparatus 38. A hollow-chamber seal, or a flexible seal, for example in the form of a lamellar seal or of a lip seal, can also be provided. The connector frame 102 will be discussed yet again further below.

In order for a filter module 48 in the plug-in movement to be able to be guided not only at the top but also at the bottom, a base guide 124 which comprises two lateral guide rails 126 which run parallel with the guide profiles 104, 106 of the connector frame 102 and on their part offer in each case one guide face 126a for a filter module 48 is moreover provided. The lateral guide rails 126, at the end thereof that is remote from the housing 98 of the docking unit 96, are likewise wedge-shaped, such that an incoming filter module 48 is threaded also there, so to speak. The base guide 124 can be comprised by the docking unit 96 or can be provided as a separate construction unit.

The feeding path for a filter module 48 in which the depositing units 50 are guided in the feeding movement is thus predefined on account of the guide profiles 104, 106 and of the base guide 124.

In the case of the present exemplary embodiment, the base guide 124 is moreover configured as a roller conveyor 128 and is thus part of the conveyor mechanism 70. The roller conveyor 128 accordingly comprises a multiplicity of conveyor rollers 130 which are mounted on the lateral guide rails 126 and on which a filter module 48 can roll. The roller conveyor 128 is configured so as to be passive, having freely rotating conveyor rollers 130. In the case of a modification, the conveyor rollers 130 can also be drivable by motor power such that the filter module 48 can be moved in an automated manner in the direction toward the entry wall 100 of the docking unit 96.

The base guide 124 also ensures the vertical alignment of the filter module 48 in the direction of height, such that the filter inlet 58 in the vertical direction is aligned to the first flow connector 86, on the one hand, and the filter outlet 60 in the vertical direction is aligned to the second flow connector 88, on the other hand.

The connector frame 102 and/or the base guide 124 are configured to be adjustable in such a manner that said connector frame 102 and/or the base guide 124 in assembly can be aligned vertically such that the filter inlet 58 and the filter outlet 60 of the filter module 48 in relation to the first and to the second flow connector 86, 88 are disposed at complementary height levels on the associated docking unit 96.

Even if the guiding apparatus 90 causes a guided movement of the filter module 48, care must be taken that the filter outlet 60 and the second flow connector 88 of the flow system 82 in the plug-in movement are interconnected in terms of flow technology. To this end, the centering apparatus 92 comprises guide wedges 132 which flank the second flow connector 88 and thus the inlet connector 80 of the branch duct 78 laterally and in the vertical direction, as can be readily seen in FIGS. 4 to 6. When the filter module 48 is driven into the guide wedges 128, said filter module 48 is aligned in the horizontal direction. A type of horizontal fine alignment of the filter module 48 in relation to the first and to the second flow connector 86 and 88 of the flow system 82 is thus performed by the centering apparatus 92.

The arrester apparatus 94 now ensures that a filter module 48 that is moved to the operating position thereof can be arrested on the docking unit 96. To this end, the arrester apparatus 94 in the case of the present exemplary embodiment comprises a first locking apparatus 134 on the entry wall 100 of the docking unit 96, and a second locking unit on the transverse brace 108 of the connector frame 102, wherein the latter can only be seen in FIG. 4, and is indicated only in a very schematic manner in FIGS. 1 and 7. In the case of the present exemplary embodiment, the locking unit is configured as a contact-pressure stay 136 which by means of a sensor controlled pneumatic cylinder on the connector frame 102 can be pivoted and pressed against the housing 56 of the filter module 48 when the filter module 48 is in the operating position thereof, as is illustrated in FIG. 4.

On its part, the locking unit 134 on the docking unit 96 on each side of the second flow connector 88 comprises a movable clamp 138, 140 which is configured so as to be complementary to holding means in the form of holding pockets 142 on the depositing unit 50. The filter housing 56 has two such holding pockets 142 in which the clamps 138, 140 can engage. FIG. 4 shows a filter module 48 which is arrested in the operating position thereof, wherein only the essential components therein are provided with reference signs.

As an alternative to the holding pockets 142, vertical holding grooves can also be provided as holding means in the housing 98, such that no precise tuning of the disposal of the components in terms of height has to be performed in the installation of the clamps 138, 140.

Figure 6:
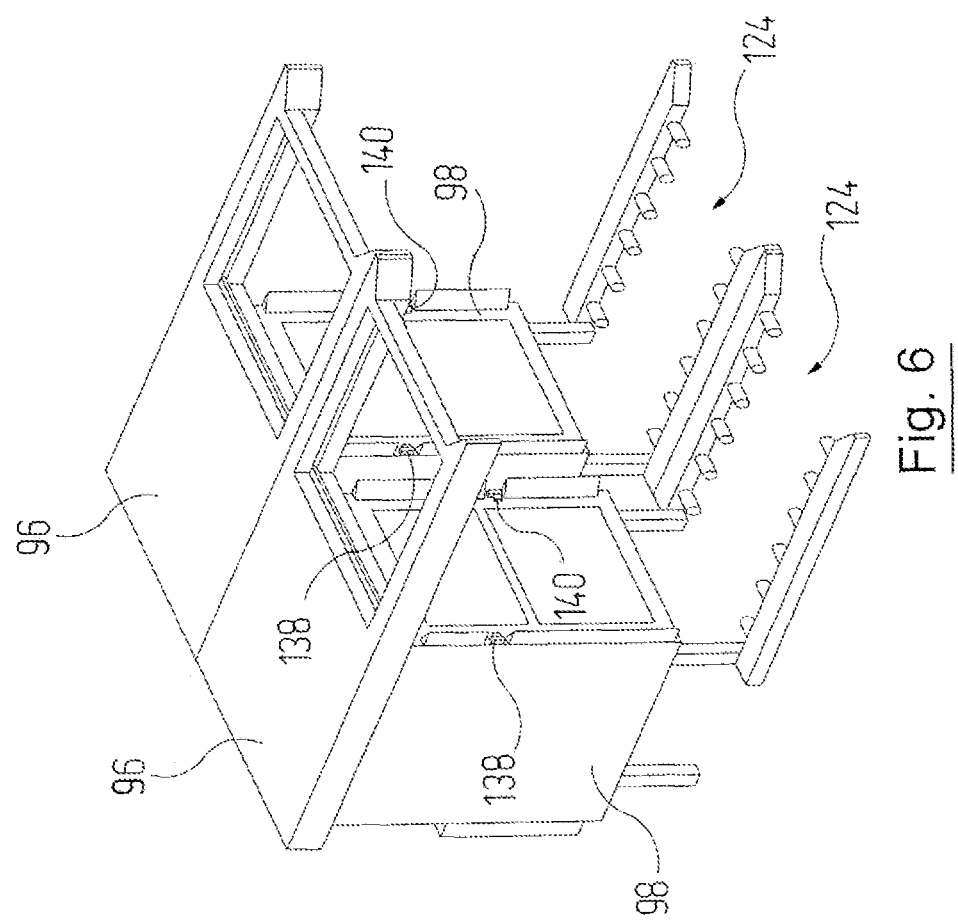
FIG. 6 shows a perspective view of two docking units which in the longitudinal direction of the painting booth are disposed behind one another.

As can be seen in FIGS. 4 and 6, the clamps 138, 140 on both sides of the second flow connector 88 are disposed at different height levels. Since the clamps 138, 140 project laterally beyond the housing 98 of the docking unit 96, this enables that two neighboring docking units 96 can be placed more closely beside one another as in the case in which the clamps 138, 140 were to be disposed at the same level. The clamps 138, 140 can are motor-operated.

A filter module 48 is drawn by the clamps 138, 140 to the second flow connector 88 of the flow system 82, on account of which a connection in terms of flow technology is established. A sealing apparatus 122 which likewise can be configured, for example, as a hollow-chamber seal or a flexible seal, for example in the form of lamellar seal or a lip seal, is likewise present on the second flow connector 88. In practice, the housing 98 of the docking station 96 has an encircling lip seal (not specifically shown) which surrounds the inlet connector 80 and against which a filter module 48 by way of which the regions of the housing wall 56b of the latter that surround the filter outlet 60 presses when said filter module 48 is in the operating position.

In order for the docking unit 96 to be able to be decoupled from the flow system 82 for the temporal period which is required for an exchange of the filter module 48, both the connector passage 112 as well as the branch duct 78 can be closed by blocking apparatuses 144.

The connector passage 112 can be closed by a gate valve 146 which impinged by a spring force or by gravity is held in a blocking position in which said gate valve 146 closes the connector passage 112. The gate valve 146 is disposed at a high level at which said gate valve 146 by the upper periphery of the housing wall 56b of the filter module 48 is pushed into a release position in which said gate valve 146 is pushed into the housing 98 of the docking unit 96 when a filter module 48 is moved to the operating position thereof.

FIG. 3 shows the gate valve 146 in the release position thereof. For safety reasons, the gate valve 146 can be manually arrested both in the blocking position as well as in the release position thereof.

The branch duct 78 is blocked or released with the aid of lamellae which cannot be seen and which can be moved to various rotational positions by means of a motor. In practice, the lamellae run vertically, but can also be aligned horizontally. Moreover, in the ongoing operation and in the case of the filter module 48 being present, the passage cross-section which is made available by the branch duct 78 for the booth air that is relieved of overspray can be set by way of the lamellae. Depending on the requirements or the conditions on site, the motor can be mounted in an upper or in a lower region of the housing 98 of the docking station 96. This can depend on which of these regions is more readily accessible for maintenance purposes, for example.

In the case of the present exemplary embodiments, the flow duct 86 and 88 are disposed so as to be stationary and cannot be moved. However, in the case of a modification (not specifically shown) the flow connector 86 and 88 can also be movable, for example in that the connector ducts 42 and the branch ducts 78 are configured in a flexible manner as duct hoses, such that the ends thereof having the flow connectors 86, 88 can be moved to a certain extent and be aligned in relation to the depositing units 50 when the latter are moved to the operating position.

The disposal of the docking units 96 and of the filter modules 48 in the depositing region 44 of the painting booth 2 can be performed according to a grid which is based on the standardized base part 68 of the filter modules 48 used. This is illustrated in FIG. 6 which shows two directly neighboring docking units 96 having the associated base guides 124, wherein for the sake of simplicity no further components are provided with reference signs. When a EUR-pallet is used as the base part 68, the docking stations 96 can be positioned at a grid dimension of 1000 mm. When the width of the housing 98 corresponds to the width of a EUR-pallet of 800 mm, such as is illustrated in the figures, in the case of a grid dimension of 1000 mm there consequently remains in each case a spacing of 100 mm between the housings 98 of two neighboring docking units 96. The clamps 138, 140 which in the mutually opposite housing sides of two neighboring docking units 96 are disposed to be offset in terms of height thus protrude into the remaining intermediate space between two docking units 96. The overall construction of the painting booth 2 can also follow this grid. The steel construction 6, the sidewalls 10, and the gridiron 20, for example, can thus be constructed in corresponding modules.

The docking units 96 comprise a measuring system 148 that is indicated in FIG. 3 and with the aid of which the loading state of the filter modules 48 can be monitored. Each filter module 48 is conceived for receiving a maximum quantity of paint, that is to say for a limit load of overspray, which depends inter alia on the construction mode of the filter module 48 and on the materials used therefor, and on the overall operating sequence of the painting booth 2. The quantity of paint that has already been received can be monitored by way of the measuring system 148. For example, a weighing apparatus 150 having weighing measuring cells can be provided to this end on the roller conveyor 128, for example. Alternatively, the limit load can be determined by means of detecting a differential pressure. The higher the load of the filter module 48, the higher the resistance to air that is built up by way of the filter module 48.

The measurement of the volumetric flow in this case can be performed by means of different types of anemometers, such as, for example, by means of a hot-wire anemometer or of an impeller anemometer. Other measuring techniques, such as, for example, people tubes, can also be used. In order to address the difficulties which can arise in the case of an increasing load of a depositing unit and the pressure loss that is associated therewith, measuring in the flow direction can be performed at and behind at least one measuring aperture which delimits the flow cross-section in a defined manner.

Optionally, an auxiliary filter material which supports the deposition of the overspray can be injected into the flow system 82, said auxiliary filter material potentially also being a mixture of substances. This auxiliary filter material can effectively prevent tacking of the depositing units 50 and/or an accumulation of liquid in depositing units 50. Such an auxiliary filter material is, for example, a pulverulent material, is in the shape of particles or granules, and/or has a fiber or cavity structure, and can be atomized or nebulized. In particular, materials which can de-tack the overspray and/or absorb or bind liquid components of the overspray are used as an auxiliary filter material, for example. Above all, chalk, rock flour, in particular chalk rock flour, aluminum silicates, aluminum oxides, silicon oxides, or the like are known for this purpose.

Moreover, a reactive auxiliary material can also be injected, with which any overspray present reacts chemically or physically, on account of which the overspray solidifies. This is also to be understood as a mere increase in viscosity such that overspray is received in the depositing unit 50 in a pasty form, for example.

In order for an auxiliary filter material of this type to now be able to be injected into the flow system 82 the connector frame 102 comprises a nozzle system 152 such that an auxiliary filter material can be injected into the flow system 82 in this manner at the first flow connectors 86 for the filter modules 48.

Each docking unit 96 comprises the components that are required for connecting the components electrically, pneumatically, and/or in fluidic terms. To this end, each docking unit 96 has an installation space 154 above the branch ducts 78, for example, said installation space extending parallel with the housing wall 56*b*. The components can be accommodated in this installation space, wherein two docking units 96 that are to be disposed in a neighboring manner can be interconnected electrically, pneumatically, and/or in fluidic terms. In practice, such an installation space 154 is configured so as to be encapsulated such that said installation space is able to be purged and the explosion-proof aspect can be taken into account. A control/evaluation unit for the sensors installed can also be accommodated in such an installation space. This installation space 154 can be configured in the manner of a duct and so as to be open at both ends, such that two such installation spaces 154 of two neighboring docking units 96 can be interconnected in a fluid tight manner. The ends of the installation spaces 154 of two docking units 96 which remain open at the beginning and at the end of a row of docking units 96, can be closed by closure elements such that a flow tight installation duct which extends through all docking units that are present beside one another is configured. This installation duct can be maintained at a positive pressure, on account of which the requirements in terms of an explosion-proof environment for the components installed can be met. On account thereof, the overall costs can be reduced since no specially-made explosion-proof components have to be installed.

Each docking unit 96 can optionally transmit data to a computer unit which can graphically display the operative states of the individual filter modules 48 on a display, for example. An operator 54 can thus continuously detect and monitor the ongoing operation.

When a filter module 48 now reaches the maximum receiving capacity thereof, the blocking apparatus 144 on the branch duct 78 is activated, such that said blocking apparat us 144 is closed. The clamps 138 are released, and the the contact-pressure stay 136 is pivoted away from the filter module 48. The forklift truck 72 is driven below the filter module 48 and the latter is lifted and herein is raised from the roller conveyor 128. The receptacle grooves 118 are dimensioned such that the filter module 48 can be lifted without impacting the groove base of the receptacle grooves 118.

The filter module 48 by way of the forklift truck 72 is then driven out of the docking unit 96. The gate valve 146 herein follows the filter module 48 in the movement of the latter, and slides into the connector frame 102 such that the connector passage 112 of the latter is closed when the filter module is removed.

Thereafter, an empty filter module 48, with the filter outlet 60 thereof leading, is moved on a forklift truck 72 over the conveyor rollers 130 of the roller conveyor 128. The guide leg 64b, 64c of the collar 64 of the filter module 48 herein are introduced into the guide grooves 118, optionally under participation of the guide wedges 104a, 106a. The housing wall 56b of the filter module 48 presses against the gate valve 146 such that the latter in the further movement of the filter module 48 is pushed back into the open position of said gate valve 146. The filter module is pushed up to the entry wall 100 of the docking unit 96 and is then lowered onto the base guide 124. The forklift truck 72 is moved out, and the clamps 138 and 140 are activated. Said clamps 138 and 140 draw the filter module 48 to the entry wall 100 and move the filter module 48 to the operating position, wherein said filter module 48 in this last part-movement rolls on the conveyor rollers 130 of the roller conveyor 128 in the direction toward the entry wall 100. The gate valves 146 are moved back into an open position again, and the freshly positioned filter module 48 is perfused by the overspray-charged booth air.

As a modification, FIG. 7 shows a painting booth 2 which is conceived for a purely manual movement of the filter modules 48. To this end, a modified conveyor mechanism 154 which is formed by idler rollers 156 on the base part 68 of each filter module 48 is present. Each filter module 48 can thus be manually repositioned by an operator 54 and is also manually displaced to the operating position by said operator 54. In this case, it is more difficult for the loading state of a filter module 48 to be detected by weighing such that the latter in this case can be more easily performed by way of the differential pressure analysis explained above.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A device for depositing overspray from the overspray-charged booth air of coating installations, comprising:
   a) a flow system for the booth air;
   wherein b) the flow system comprises a plurality of depositing units through which overspray-charged booth air is directable and in which overspray is deposited;
   c) the depositing units being configured as an exchangeable construction unit having a filter housing, a filter inlet, a filter unit, and a filter outlet, each depositing unit being feedable to the flow system in a feeding movement wherein the depositing units are moved into an operating position, or can be separated and removed from the operating position in the flow system;
   d) in the operating position of a depositing unit from the depositing units, the filter inlet of the depositing unit is connected to an associated first flow connector of the flow system, and the filter outlet of the depositing unit is connected to an associated second flow connector of the flow system;
   and
   e) docking means by way of which the filter inlet and the filter outlet of one of the depositing units and the flow connectors of the flow system during the feeding motion are forcibly aligned in relation to one another.

2. The device as claimed in claim 1, wherein the docking means comprise a guiding apparatus for guiding the depositing units in the feeding movement in a respective feeding path.

3. The device as claimed in claim 2, wherein the guiding apparatus offers guiding faces for in each case one depositing unit.

4. The device as claimed in claim 3 wherein guide profiles which provide guiding faces are present.

5. The device as claimed in claim 4, wherein the guide profiles are comprised by a connector frame which offers a first flow connector of the flow system.

6. The device as claimed in claimed 2, further comprising a base guide by way of which in each case one of the depositing units is guidable across a base part of this depositing unit.

7. The device as claimed in claim 1, wherein the first flow connector in terms of flow technology is connected to an air guiding system by way of which overspray-charged booth air is directable to the respective filter inlets of the depositing units.

8. The device as claimed in claim 1, wherein the docking means comprise a centering apparatus for centering one of the depositing units during the feeding movement so that, the filter inlet of said depositing unit is centered in relation to the first flow connector, and/or the filter outlet of said depositing unit is centered in relation to the second flow connector.

9. The device as claimed in claim 8, wherein the centering apparatus comprises one or a plurality of guide wedges which laterally flank the second flow connector of the flow system.

10. The device as claimed in claim 1, wherein the docking means comprise an arrester apparatus by way of which the depositing units in the operating position are arrestable in a releasable manner.

11. The device as claimed in claim 10, wherein the arrester apparatus comprises at least one movable clamp which is configured so as to be complementary to a holding means on the depositing unit.

12. The device as claimed in either of claim 10, wherein the arrester apparatus is operable by motor power.

13. The device as claimed in claim 1, wherein the docking means are at least partially comprised by a docking unit which has a housing which provides the first flow connector and/or the second flow connector of the flow system.

14. The device as claimed in claim 1, further comprising a conveying mechanism by way of which the feeding movement can be performed at least in portions.

15. The device as claimed in claim 14, wherein the conveying mechanism comprises a roller conveyor.

16. The device as claimed in claim 14, wherein the conveying mechanism comprises idler rollers on a respective base part of the depositing units.

17. A surface treatment installation for treating objects, comprising:
   a) a treatment booth having a treatment tunnel through which booth air is directable, wherein the air absorbs and entrains overspray that is present;
   wherein
   b) the treatment booth comprises a depositing region in which a depositing device is disposed, overspray-charged booth air being directable to said depositing device and overspray being depositable by said depositing device;
   further wherein
   c) the depositing device is configured as claimed in claim 1.

18. The surface treatment installation as claimed in claim 17, wherein the treatment booth is at least in regions constructed according to a grid which is predefined by the depositing units.

19. The device as claimed in claim 15, wherein the roller conveyor comprises a passive roller conveyor having freely running conveyor rollers.

* * * * *